May 12, 1942.                E. O. BENNETT                2,282,987
                        AUTOMATIC SHUT-OFF VALVE
                          Filed Oct. 17, 1940
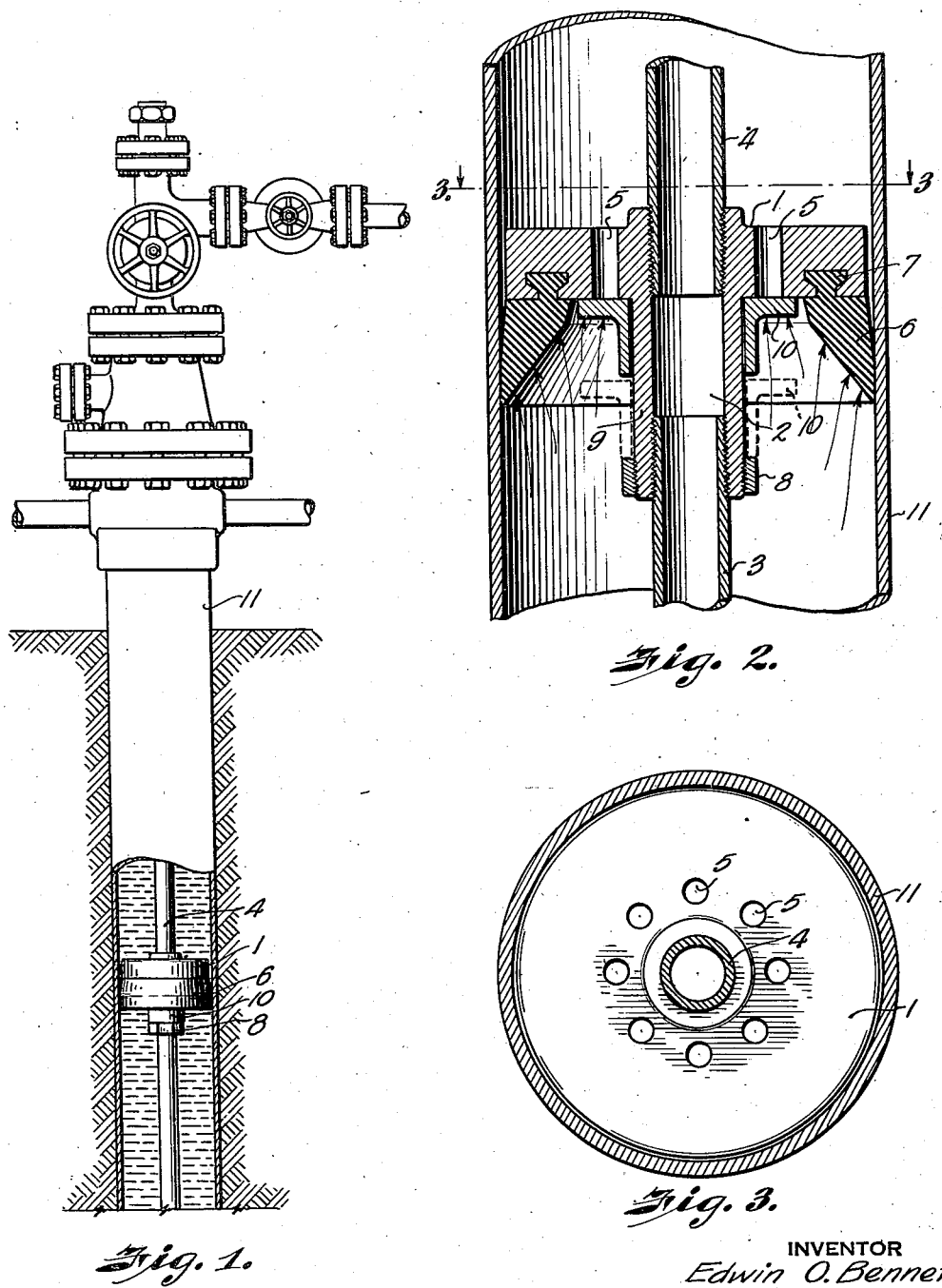
INVENTOR
Edwin O. Bennett
BY
ATTORNEY Patented May 12, 1942

2,282,987

UNITED STATES PATENT OFFICE 2,282,987

AUTOMATIC SHUTOFF VALVE

Edwin O. Bennett, Ponca City, Okla., assignor to Continental Oil Company, Ponca City, Okla., a corporation of Delaware Application October 17, 1940, Serial No. 361,570

1 Claim. (Cl. 166—2)

My invention relates to an automatic shut-off valve and more particularly to an automatic valve for stopping fluid flow between tubing and casing in oil and gas wells.

Most deep oil and gas wells are completed with one or more strings of casing and a flow string of tubing. Automatic shut-off devices have been developed for the stopping of fluid flow from the central string of tubing in the event of accidental or willful damage to the well-head connections. Such shut-off valves will prevent a well from running wild through the tubing in event of such damage.

Occasionally, the casing head which normally closes the annular space between the eduction tubing and the casing becomes damaged. No provision has been made heretofore for the protection of wells whose casing heads or casing become damaged. In many wells, high formation pressure exists and it is imperative to maintain the formation pressure within the casing.

One object of my invention is to provide an automatic shut-off valve which will stop the flow of fluids through the annular space between the tubing and the casing in event of damage to the well-head or "Christmas tree" connections.

In the accompanying drawing which forms part of the instant specification and is to be read in conjunction therewith and in which like reference numerals are used to indicate like parts in the various views;

Figure 1 is a diagrammatic cross section of the upper portion of an oil well showing a device embodying my invention, in place in the well.

Figure 2 is an enlarged sectional elevation of a device embodying my invention.

Figure 3 is a sectional view taken on the line 3—3 of Figure 2.

Referring now to the drawing, a body member 1 having an annular bore 2 is screwed into the eduction tubing string and forms part thereof. Tubing 3, secured to the lower portion of the body member and tubing 4, secured to the upper portion of the body member, form the eduction path of oil from the well. The body member 1 is formed with a plurality of bores 5 providing communication above and below the body member 1. A sealing member 6 of any suitable plastic material is held in the body member by means of a groove 7, formed therein. The sealing ring 6 is adapted to seat against the walls of the casing 11, as will hereinafter be more fully described.

A ring 8 is threaded around the exterior of the nipple 9 which is formed integral with the body member 1. Ring 8 acts as a stop upon which a vertically movable annular valve 10 normally rests. The valve normally is in the dotted line position shown in Figure 2 and communication is provided above and below the sealing ring 6 through the ports 5. The weight of the valve 10 is such that it will be lifted and moved to seating position shutting off the ports 5 only at predetermined rates of fluid flow.

In the event of an increase in the flow of fluids in the annular space between the tubing 3 and the casing 11, the valve 10 is lifted to seat to close the ports 5. Closing of the ports tends to build up pressure in the annular space below the valve. This pressure seats the plastic sealing ring 6 and, at the same time, holds the valve 10 more strongly on its seat, thus effecting a complete seal. After the break has been repaired, the pressure will equalize and the valve 10 will again move to its dotted line position.

It will be seen that I have accomplished the objects of my invention. I have provided an automatic shut-off valve which will prevent the escape of fluids from the well between the eduction tubing and the well casing in the event of injury to the well-head.

It will be understood that certain features and sub-combinations are of utility and may be employed without reference to other features and sub-combinations. This is contemplated by and is within the scope of my claim. It is further obvious that various changes may be made in details within the scope of my claim without departing from the spirit of my invention. It is, therefore, to be understood that my invention is not to be limited to the specific details shown and described.

Having thus described my invention, I claim:

In an oil well having a casing, a body member formed with a bore and a flange, tubing secured to said bore and forming an eduction path therewith, a plurality of ports in said flange, an annular valve adapted to close said ports, means for positioning said valve below said ports at a predetermined distance therefrom, means for sealing the space between said flange and said casing, said valve being of such weight as to remain in unseated position until the velocity of fluid passing through said ports reaches a predetermined point.

EDWIN O. BENNETT.